United States Patent
Carl

(10) Patent No.: US 12,291,153 B2
(45) Date of Patent: May 6, 2025

(54) ASSEMBLY OF AN ADJUSTMENT DEVICE OF A MOTOR VEHICLE, AND WINDOW LIFTER

(71) Applicant: Brose Fahrzeugteile SE & Co. Kommanditgesellschaft, Bamberg, Bamberg (DE)

(72) Inventor: Andre Carl, Ebersdorf (DE)

(73) Assignee: BROSE Fahrzeugteile SE & Co. Kommanditgesellschaft, Bamberg, Bamberg (DE)

( * ) Notice: Subject to any disclaimer, the term of this patent is extended or adjusted under 35 U.S.C. 154(b) by 0 days.

(21) Appl. No.: 18/461,966

(22) Filed: Sep. 6, 2023

(65) Prior Publication Data

US 2023/0406241 A1      Dec. 21, 2023

Related U.S. Application Data

(63) Continuation of application No. PCT/EP2022/056287, filed on Mar. 11, 2022.

(30) Foreign Application Priority Data

Mar. 18, 2021   (DE) .................... 10 2021 202 669.9

(51) Int. Cl.
| | |
|---|---|
| *E05F 15/689* | (2015.01) |
| *B60R 16/02* | (2006.01) |
| *B60J 1/12* | (2006.01) |

(52) U.S. Cl.
CPC ........ *B60R 16/0215* (2013.01); *E05F 15/689* (2015.01); *B60J 1/12* (2013.01);
(Continued)

(58) Field of Classification Search
CPC .. B60R 16/0215; E05F 15/689; E05F 11/382; B60J 1/12; E05Y 2201/64;
(Continued)

(56) References Cited

U.S. PATENT DOCUMENTS

| | | | | |
|---|---|---|---|---|
| 4,939,867 A | * | 7/1990 | Harada | ................. E05F 15/689 49/362 |
| 6,570,093 B2 | * | 5/2003 | Doshita | ............... B60R 16/0215 174/72 A |

(Continued)

FOREIGN PATENT DOCUMENTS

| | | |
|---|---|---|
| DE | 102009037674 A1 | 2/2011 |
| DE | 202015102718 U1 | 10/2016 |

(Continued)

*Primary Examiner* — Jerry E Redman
(74) *Attorney, Agent, or Firm* — Laurence A. Greenberg; Werner H. Stemer; Ralph E. Locher

(57) ABSTRACT

An assembly of an adjustment device of a motor vehicle includes a support on which at least one guide rail is disposed. An adjustment part, in particular for a functionalized window pane, is slidably guided on the guide rail. A flexible guide tube for guiding a cable, in particular for supplying power to and/or for controlling the window pane, extends between the guide rail and the support, in a guide region extending in the rail longitudinal direction. A resilient or flexurally elastic securing element for securing the guide tube against leaving the guide region is provided along the guide rail and adjacent the guide region in a securing position.

15 Claims, 5 Drawing Sheets

(52) U.S. Cl.
CPC ..... *E05Y 2201/64* (2013.01); *E05Y 2201/684* (2013.01); *E05Y 2900/55* (2013.01)

(58) Field of Classification Search
CPC .......... E05Y 2201/684; E05Y 2900/55; E05Y 2400/654; E05Y 2800/344
USPC .......................................... 49/348, 349, 352
See application file for complete search history.

(56) References Cited

U.S. PATENT DOCUMENTS

| | | | | |
|---|---|---|---|---|
| 7,669,368 | B2* | 3/2010 | Kuhnen | H02G 11/006 |
| | | | | 49/502 |
| 8,153,897 | B2* | 4/2012 | Yamamoto | B60R 16/0215 |
| | | | | 174/72 A |
| 8,802,986 | B2* | 8/2014 | Satou | H02G 11/003 |
| | | | | 174/72 A |
| 8,937,250 | B2* | 1/2015 | Terada | B60N 2/0725 |
| | | | | 296/65.13 |
| 9,422,759 | B2 | 8/2016 | Huber et al. | |
| 10,427,504 | B2* | 10/2019 | Mueller | B60J 1/1846 |
| 10,439,321 | B2* | 10/2019 | Klein | H01R 13/6275 |
| 11,108,218 | B2* | 8/2021 | Yokoyama | H02G 3/0462 |
| 11,306,528 | B2* | 4/2022 | Matsumoto | B60J 10/20 |
| 11,318,818 | B2* | 5/2022 | Arimoto | E05F 15/689 |
| 11,745,566 | B2* | 9/2023 | Nam | B60R 16/03 |
| | | | | 359/265 |
| 2001/0052203 | A1* | 12/2001 | Doshita | B60R 16/0215 |
| | | | | 49/502 |
| 2006/0042167 | A1* | 3/2006 | Dedrich | E05F 15/689 |
| | | | | 49/358 |
| 2006/0059782 | A1* | 3/2006 | Garcia | B60R 16/0215 |
| | | | | 49/358 |
| 2007/0148994 | A1* | 6/2007 | Sato | B60R 16/0215 |
| | | | | 439/34 |
| 2009/0064591 | A1* | 3/2009 | Keller | E05B 85/08 |
| | | | | 292/216 |
| 2023/0406241 | A1* | 12/2023 | Carl | B60R 16/0215 |

FOREIGN PATENT DOCUMENTS

| | | |
|---|---|---|
| WO | 2012069107 A1 | 5/2012 |
| WO | 2014122146 A1 | 8/2014 |

* cited by examiner

ASSEMBLY OF AN ADJUSTMENT DEVICE OF A MOTOR VEHICLE, AND WINDOW LIFTER

CROSS-REFERENCE TO RELATED APPLICATION

This application is a continuation, under 35 U.S.C. § 120, of copending International Patent Application PCT/EP2022/056287, filed Mar. 11, 2022, which designated the United States; this application also claims the priority, under 35 U.S.C. § 119, of German Patent Application DE 10 2021 202 669.9, filed Mar. 18, 2021; the prior applications are herewith incorporated by reference in their entirety.

FIELD AND BACKGROUND OF THE INVENTION

The invention relates to an assembly of an adjustment device of a motor vehicle, with a rail-guided adjustment part, in particular for or with a functionalized window pane of a motor vehicle. It further relates to a window lifter of a motor vehicle, with such an assembly.

Such an assembly is here understood in particular to mean a door module with a carrier plate, or such a carrier plate, on which components or parts of an in particular electromotive window lifter, preferably of a cable window lifter, are arranged or are or can be installed.

The term "functionalized window pane" is to be understood in particular to mean an electrically switchable or controllable piece of (motor vehicle) glass, i.e., a window pane with an electrically switchable or activatable/controllable functional layer, in particular an electro-transparent layer, a layer with an antenna function, a heatable layer, or an illuminatable layer. In other words, an optical and/or thermal functional layer of the window pane is provided, the functions of which can be influenced, modified, switched, or controlled by way of electrical control signals. A functionalized window pane is also understood to mean a tintable piece of glass in the manner of electroactive or electrochromic glass (smart glass).

In order to activate such functionalized window panes, they have to be coupled, for the purpose of transmitting the control signals, to an energy source and/or a control device (controller) as an electronics system. In particular in the case of movable or adjustable window panes of a motor vehicle, for example a side window pane or a sunroof, the connection between the window pane and the electronics system using the transmission of signals is associated with a high degree of structural and mounting complexity.

In addition, the routing of lines or a cable with such lines for supplying current and/or signals to the window pane is often associated with complex tools and with a large space requirement. Thus, a lever arrangement, known, for example, from international publication WO 2012/069107 A1 and its counterpart U.S. Pat. No. 9,422,759 B2, as a guide device for a line between attachment points on the window pane and on a vehicle element is undesirably complex.

A guide device known from the commonly assigned German published patent application DE 10 2009 037 674 A1, which uses a slide block guided along an independent guide rail for routing the cable or lines, is also undesirably complex. Undesired noise emissions, for example when closing the vehicle door (slamming the door), also occur.

In the case of a window lifter assembly known from the commonly assigned international publication WO 2014/122146 A1, a guide device consists of a flexible cable holder guiding the cable from a cable supply on a module carrier to the window pane, and a dimensionally stable cable holder guide which determines the course of the window pane, is mounted pivotably on the module carrier by means of a rotary bearing, and is pretensioned in a first direction of rotation via a spring element. When the window pane is lowered, the dimensionally stable cable holder guide is pivoted in a second direction of rotation counter to the pretension of the spring element, whereas when the window pane is raised, the dimensionally stable cable holder guide is pivoted in the first direction of rotation, assisted by the spring element.

A structurally simplified cable guide of a window lifter assembly using a dimensionally stable cable holder guide with a winding device connected to the module carrier, and with a guide element which guides a flexible cable holder, for example a corrugated tube, during adjustment of the window pane in a predetermined region between the module carrier and the vehicle body is known, for example, from our commonly assigned German Gebrauchsmuster (utility model) DE 20 2015 102 718 U1.

When a corrugated tube guided between a guide rail of a window lifter and a guide element is used with an (electric) cable held therein at least in some areas or sections, the disadvantage or the problem often exists that the corrugated tube with the cable held therein for supplying current to the window pane undergoes a change of shape, for example temperature-induced, in a certain situation, in particular in an upper or top situation of the window pane. This can in turn cause the corrugated tube with the cable held therein to buckle in an undefined fashion in some areas in a different situation of the window pane and thus to be unguided in a region which is not defined.

SUMMARY OF THE INVENTION

It is accordingly an object of the invention to provide an adjustment device which overcomes the above-mentioned and other disadvantages of the heretofore-known devices and methods of this general type and which provides for a suitable assembly of an adjustment device of a motor vehicle, in particular with or for a functionalized window pane. It is a further object to provide for a particularly suitable window lifter.

With the above and other objects in view there is provided, in accordance with the invention, an assembly of an adjustment device of a motor vehicle, the assembly comprising:

a carrier and at least one guide rail disposed on said carrier;

an adjustment part displaceably guided on said guide rail; and a flexible guide tube for guiding an electric cable connected to, or connectible to, said adjustment part, said guide tube having a first tube end attached to said carrier and a second tube end attached to said adjustment part;

wherein, during a displacement of said adjustment part along said guide rail, said second tube end is moved together with said adjustment part and, as said first and second tube ends approach one another, said guide tube is forcibly deflected in a curve; and wherein said guide tube is guided between said guide rail and said carrier in a guide region extending in a longitudinal direction; and a resiliently or flexurally elastic securing element disposed at a securing position along said guide rail and adjacent to and/or spaced apart from said guide region, said securing element being configured for securing said guide tube against escape from said guide region.

The assembly is part of an adjustment device of a motor vehicle or such an adjustment device itself. The assembly has a carrier on which at least one guide rail is arranged. The assembly furthermore has an adjustment part guided displaceably on the guide rail, and a flexible guide tube for guiding an electric cable which is or can be connected to the adjustment part. A first tube end of the guide tube is attached to the carrier and the second tube end of the guide tube is attached to the adjustment part. During a displacement of the adjustment part along the guide rail, the second tube end is moved with it in such a way that, when the two tube ends approach each other, the guide tube is forced to be deflected in a curve. The guide tube is guided between the guide rail and the carrier in a guide region running in the longitudinal direction of the rail. At a securing position along the guide rail and adjacent to and/or spaced apart from the guide region, a resiliently or flexurally elastic securing element is provided for securing the guide tube against escape from the guide region. The assembly can be a seat adjustment system or an adjustable sunroof of a motor vehicle.

In particular, the assembly is a window lifter assembly with a carrier plate (module carrier, subassembly module) as a carrier, for example of a door module. The assembly has at least one guide rail on which a carriage is guided as an adjustment part. The guide rail, in particular of a single-strand window lifter, or alternatively two guide rails parallel with each other, in particular of a two-strand window lifter, are arranged (installed) on the carrier plate.

An electromotive drive (cable drive) is, in the case of a cable window lifter, coupled to a cable drum on which at least one pull cable connected to the or each carriage is wound in a loop such that during (window lifter) operation, one cable end is unwound from the cable drum and, in particular simultaneously, the other end cable is unwound.

The term adjustment part is understood within the scope of the invention to mean firstly in general a moved or movable element, in particular a connecting element between vehicle components or assembly components. Specifically, a carriage is understood to mean a connecting element between a window pane and a window lifter of a motor vehicle, said carriage guiding the window pane adjustably along an adjustment path in order to move the window pane in the installed state along the adjustment path between a closed position and an open position (open location). The carriage thus also has a rail slide or a rail slide function. The window pane is a functionalized window pane, in particular an electrically switchable or controllable window pane. It expediently has an electric contact point as a connection region. The carriage can also comprise a pane adapter connected to the window pane.

In the case of the window lifter assembly, it has a flexible, in particular an elastic, flexurally elastic, flexurally soft, and/or elastically deformable part as a guide tube for guiding an (electric) cable, which is or can be connected to the functionalized window pane, or a line. The term cable should be understood to mean a number of lines, in particular surrounded by means of a cable sheath or insulating sheath, for conducting current and/or controlling the window pane. The cable or the line or lines are coupled in a suitable fashion to or onto the carriage as an adjustment part which is coupled, connected, and/or electrically contacted to the electrical connection region of the window pane.

The flexible (elastic) part can be designed in the manner of a cable carrier or as a hollow tube or in the manner of a hollow tube, wherein a round, for example circular or oval, or an angular, for example a rectangular or triangular, profile cross-section of the hollow tube is possible. The flexible (elastic) part is preferably a cable holder, in particular manufactured from plastic, in the form of a corrugated tube. The cable or the or each line is held in a suitable fashion at least over a part of its or their length, i.e., in some sections, inside the part referred to below as a guide tube. The guide tube preferably completely encloses the corresponding cable section or line section of the cable serving to supply current to and/or to control the functionalized window pane, or an electric adjustment drive in the case of an electromotively adjustable seat or sunroof. The cross-sectional area of the guide tube or the corrugated tube is expediently round, in particular circular.

A first tube end, referred to below also as the carrier-side tube end, of the guide tube is held, arranged, and/or fastened, preferably stationarily, on the carrier plate. The second tube end, referred to below also as the carriage-side tube end, of the guide tube is attached to the carriage, the adapter, or the window pane and is therefore also held, arranged, and/or fastened there. During a (vertical) displacement of the carriage, typically in the Z direction of the vehicle, along the guide rail, the carriage-side (second) tube end is moved with the carriage in such a way that, when the two tube ends approach each other, the guide tube is forced to be deflected in a curve.

The guide tube is guided between the guide rail and the carrier plate in a guide region running in the longitudinal direction of the rail. The guide region is preferably a longitudinal slot or groove, open in particular in the longitudinal direction of the rail, in which the guide tube lies over a part of its peripheral or outer surface. When the carriage is adjusted in the longitudinal direction of the rail along the guide rail, a tube section adjoining the carriage-side (second) tube end of the guide tube passes a tube section adjoining the carrier-side (first) tube end with a spacing oriented transversely to the longitudinal direction of the rail.

At a securing position along the guide rail and adjacent to the guide region, a resiliently or flexurally elastic securing element is provided for securing the guide tube against escape from the guide region. The securing position of the securing element is spaced apart, in the longitudinal direction of the guide rail, in a suitable fashion from the first carrier-side tube end of the guide tube (relative to the typical vehicle coordinates in the Z direction) and expediently is arranged in a region, close to the open position of the window pane), along the guide rail.

According to an advantageous development, the securing element has a resilient bent section. The securing element is designed in a suitable fashion in the manner of a ramp with an ascending and a descending sliding ramp. At least one of the slide ramps is here expediently fastened at the end of the carrier or the carrier plate. The securing element is preferably formed onto the carrier or the carrier plate or is formed therefrom. In particular, the securing element is designed and arranged in such a way that, when the carriage or the adjustment part is adjusted in the longitudinal direction of the rail, it deforms the securing element or its resilient bent section at the securing position so that it can spring back. In other words, the securing element which is raised relative to the plane of the carrier plate (of the carrier) and in particular extends relative to the latter with respect to the typical vehicle coordinates in the case of the window lifter assembly from the XY plane in the Y direction, is deflected into the plate plane of the carrier plate (of the carrier) when the carriage (adjustment part) travels over it in the course of the adjustment movement of said carriage (adjustment part).

In an advantageous embodiment, a retaining contour spaced apart from the guide rail and in which a tube section adjoining the first tube end of the guide tube is guided is provided on the carrier plate or the carrier. The retaining contour is expediently formed from a plurality of tube grippers that are fastened to the carrier plate (the carrier) or formed therefrom. During the displacement of the carriage (adjustment part) along the guide rail into a (second) terminal position, for example into an open position of the window pane, the guide tube or that tube section of the guide tube which is close to the carrier-side tube end escapes from the retaining contour or enters the latter when the carriage (the adjustment part) is displaced along the guide rail into a further (first) terminal position, for example into a closed position of the window pane. Particularly advantageously, the retaining contour is arranged along the guide rail in a region close to the closed position of the window pane.

In a particularly suitable application or use, the assembly is provided in a window lifter of a motor vehicle, said window lifter being provided, suited, and/or configured for a non-functionalized window pane and/or also for a functionalized window pane, for example of a vehicle door. The assembly can, however, also be part, for example, of a sunroof or a seat adjustment system of a motor vehicle.

Other features which are considered as characteristic for the invention are set forth in the appended claims.

Although the invention is illustrated and described herein as embodied in an assembly of an adjustment device of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

Mutually corresponding and functionally equivalent parts and dimensions are provided with the same reference numerals and signs throughout the figures.

DETAILED DESCRIPTION OF THE INVENTION

Figure 1:
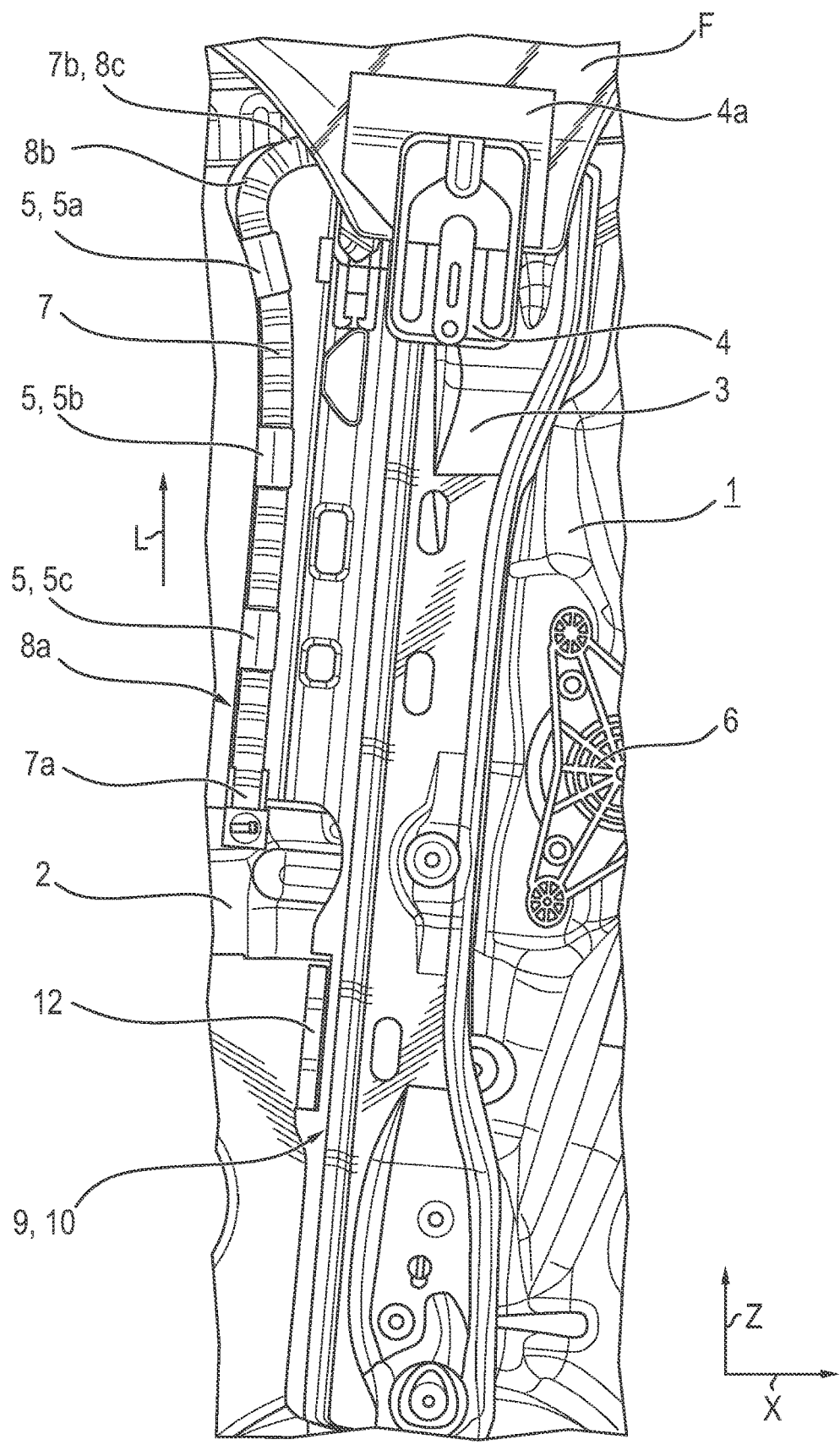
FIG. 1 shows a portion of an assembly of a (cable) window lifter with a guide tube, arranged along a guide rail, for an electric cable for controlling and/or supplying current to a functionalized window pane which is retained or can be fastened (installed) on carriages guided along the guide rails.

Referring now to the figures of the drawing in detail and first, in particular, to FIG. 1 thereof, there is shown an assembly 1 as part of an adjustment device of a motor vehicle, with a carrier plate (carrier) 2, for example of a door module. Specifically, FIG. 1 shows a window lifter assembly, also referred to below as a window lifter, a part (portion) of which is shown in FIGS. 2 to 5.

Specifications of the spatial directions are also specified below in particular in a coordinate system of the motor vehicle (vehicle coordinate system) with respect to an exemplary installed situation of a window lifter in a side door of the motor vehicle. The abscissa (X axis, X direction) is here oriented in the longitudinal direction of the vehicle (driving direction) and the ordinate (Y axis, Y direction) in the transverse direction of the vehicle and the applicate (Z axis, Z direction) in the vertical direction of the vehicle.

The assembly 1 has at least one guide rail 3 on which a carriage 4—forming an adjustment part with a rail slide function, or a rail slide with a carriage function—is guided so that it can be moved by sliding in the longitudinal direction of the rail L. The guide rail 3 is arranged (mounted, installed) on the carrier plate 2. A retaining contour or structure 5 is provided or arranged on the carrier plate 2. The retaining contour 5, which is situated with a spacing from the guide rail 3, is formed in the exemplary embodiment by gripper elements 5a to 5c which are formed from the carrier plate 2 and are spaced apart from one another in the Z direction.

An electromotive drive (cable drive) 6 is coupled in a manner not illustrated in detail to a cable drum on which a pull cable connected to the carriage 4 and guided over rail-side or carrier-side deflection elements is wound in a loop such that, during the operation of the window lifter, one cable end is wound onto the cable drum and the other cable end is unwound therefrom. As a result, adjustment takes place of a window pane F connected to the carriage 4 via a (pane) adapter 4a in order to move said window pane in the installed state along the adjustment path between a closed position (first terminal position) and an open position (second terminal position). The window pane F is here a functionalized, in particular electrically switchable or controllable window pane. It expediently has an electrical contact point as an electrical connection region which corresponds to an electrical connection region of the carriage 4 or the adapter 4a.

The assembly 1 moreover has a flexible, i.e., an elastic, in particular flexurally elastic, part in the form of a guide tube 7 for holding and guiding an electric cable, which is or can be connected to the functionalized window pane F, or a line. A cable is here understood to mean a number of lines, in particular surrounded by a cable sheath or insulating sheath, for conducting current to and/or controlling the window pane F. The cable is coupled in a suitable fashion to or onto the carriage 4 or onto the adapter 4a which in turn is coupled, connected, and/or electrically contacted to the electrical connection region of the window pane F.

The flexible (elastic) guide tube 7 is preferably designed so that it acts in the manner of a cable carrier and particularly preferably as a corrugated tube. The cable or the or each line is accommodated in a suitable fashion at least over a part of its or their length, i.e., in some sections, inside the flexible guide tube 7. The guide tube 7 is made in a suitable fashion from a plastic. The guide tube 7 preferably completely encloses the corresponding cable or line section, i.e., holds the corresponding cable section. The cross-sectional area of the guide tube 7 is expediently round, in particular circular.

The guide tube 7 is retained with a first carrier-side tube end 7a on the carrier plate 2 or is attached thereto. The other (second) tube end 7b of the guide tube 7 is retained on the carriage 4 (on the carriage side) or on the adapter 4a or also on the window pane F or is connected thereto. A first or upper tube section 8a, adjoining the carrier-side tube end 7a, of the guide tube 7 is retained in the region of the carrier-side retaining contour 5 on the latter or on the carrier element 2, or is connected thereto. The retaining contour 5 extends in the Z direction and is oriented more or less parallel to the guide rail 3. In particular, the retaining structure 5 is arranged spaced apart from the guide rail 3.

In the situation of the carriage 4 shown in FIG. 1, in a position corresponding to the closed position of the window pane, the first or upper tube section 8a of the guide tube 7 extends from the carrier-side (first) tube end 7a as far as an approximately U-shaped turning section 8b of the guide tube 7. The second carriage-side tube end 7b of the guide tube 7 here adjoins practically directly the turning section 8b of the guide tube 7.

Figure 2:
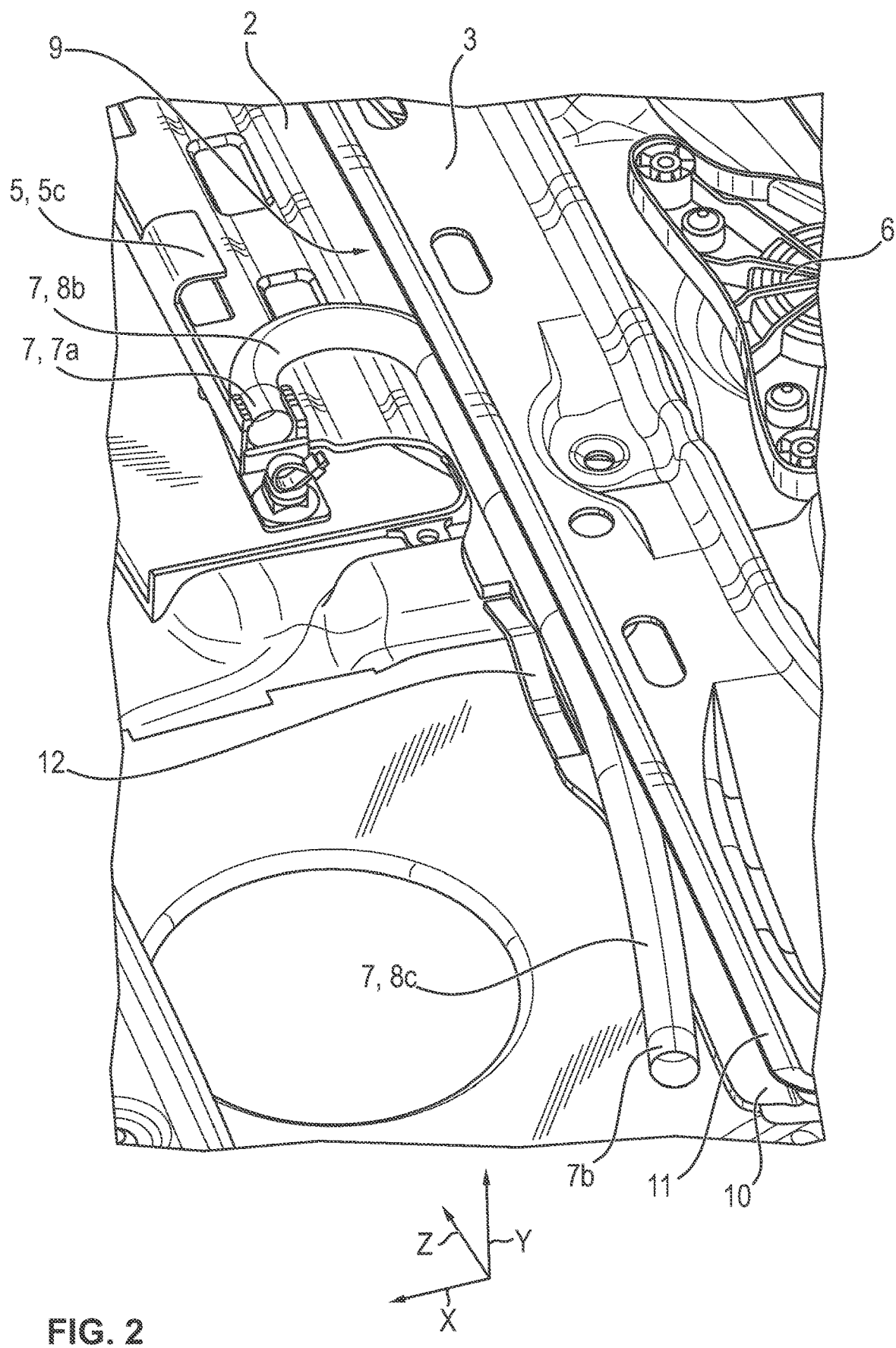
FIG. 2 shows in a perspective illustration a portion of the assembly according to FIG. 1 with a carriage-side tube end shifted into an open position relative to the carriage position in FIG. 1.

In the carriage position illustrated in FIG. 2, in a situation of the carriage 4 corresponding to the open position of the window pane, the first carrier-side tube end 7a of the guide tube 7 adjoins practically directly its turning section 8b, while a second or lower tube section 8c of the guide tube 7 then adjoins the carriage-side second tube end 7b. In other words, the turning section 8b of the guide tube 7 is shifted downward when the carriage 4 is adjusted in the longitudinal direction of the rail L from an upper (first) position (of the window pane F) into a lower (second) position (of the window pane F), and upward when the carriage 4 is adjusted in the opposite direction. The respective length of the tube section 8a and 8c of the guide tube 7 thus changes accordingly.

It can be seen in FIG. 1 that the retaining structure 5 is arranged along the guide rail 3 in a region close to the closed position of the window pane. The carrier-side retaining structure 5 is formed from a number of tube grippers which are fastened on the carrier plate 2 and are preferably formed from the latter, as gripper elements 5a to 5c. The carrier-side retaining structure 5 with its tube grippers 5a to 5c is situated in front of the guide rail 3 by a spacing in the X direction.

During a displacement of the carriage 4 in the longitudinal direction of the rail L along the guide rail 3 into an open position of the window pane, the guide tube 7 or its (upper, first) tube section 8a escapes from the retaining contour 5 and enters the latter again when the carriage 4 is displaced along the guide rail 3 into a closed position of the window pane F corresponding to the illustration in FIG. 1.

The guide tube 7 is additionally guided on the guide rail 3. The guide rail 3 has for this purpose a guide region 9, running in the longitudinal direction of the rail, for the guide tube 7. It is a longitudinal slot or groove 10 which acts as a guide channel open in the X direction and in which the guide tube 7 lies over a part of its peripheral or outer surface. The longitudinal slot or groove 10 is formed between the carrier plate 2 and a raised lip 11, projecting from the plane of said carrier plate, of the guide rail 3.

During a (vertical) displacement of the carriage 4, in the Z direction of the vehicle, along the guide rail 3, the carriage-side (second) tube end 7b of the guide tube 7 is moved with the carriage in such a way that, when the two tube ends 7a, 7b approach each other, the guide tube 7 is forced to be deflected in a curve. The corresponding travel of the guide tube 7 from an upper position of the carriage 4 corresponding to the closed position of the window pane into a lower position corresponding to the open position of the window pane F is illustrated in FIGS. 1 and 2. The guide tube 7 is here guided firstly in the retaining contour 5 which is more or less parallel to the guide rail 3 and then increasingly in the guide region 9, running in the longitudinal direction of the rail L, between the guide rail 3 and the carrier plate 2.

As can be seen in FIG. 2, the guide tube 7 then lies with the tube section 8c, adjoining the carriage-side (second) tube end 7b, in the guide region 9 and is therefore guided therein. When the carriage 4 is adjusted in the longitudinal direction of the rail L along the guide rail 3, the tube section 8c adjoining the carriage-side (second) tube end 7b of the guide tube 7 passes the tube section 8a adjoining the carrier-side (first) tube end 7a with a spacing oriented transversely to the longitudinal direction of the rail L.

Figure 3:
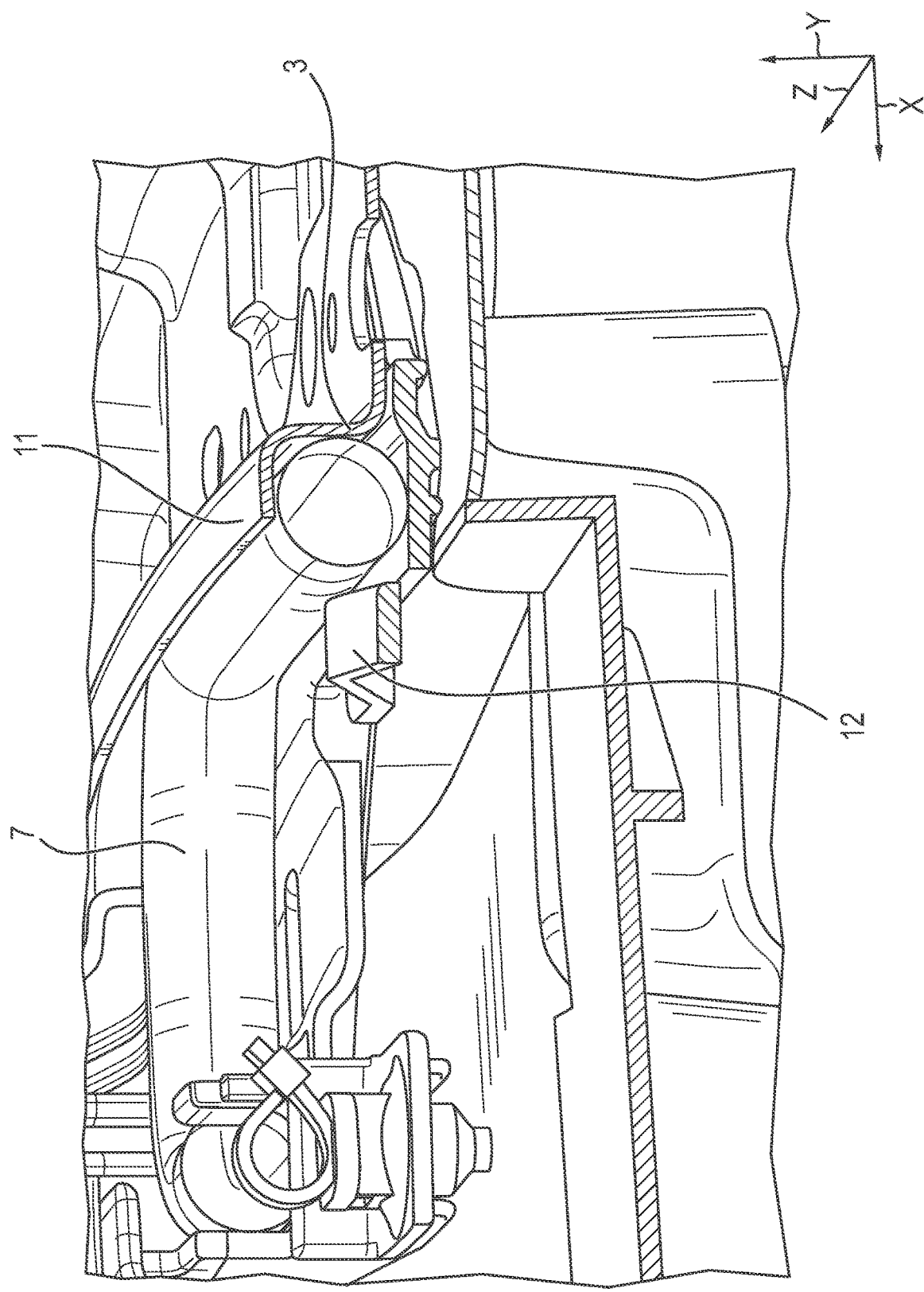
FIG. 3 shows a perspective illustration in section along the line III-III in FIG. 2.
Figure 4:
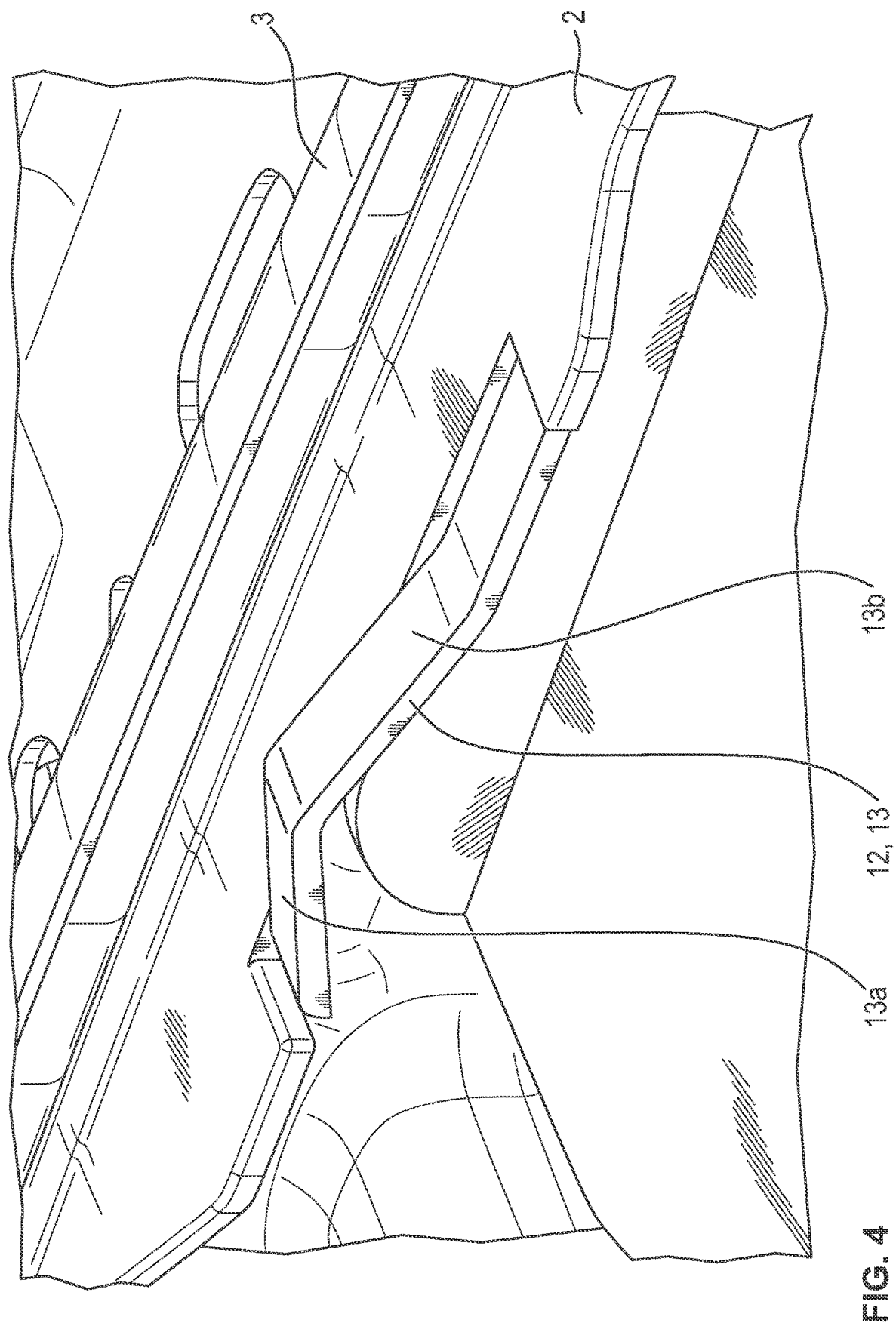
FIGS. 4 and 5 show in perspective illustrations a portion of the assembly according to FIG. 1 without a guide tube, and with a guide tube respectively, in the region of a securing element for the latter.
Figure 5:
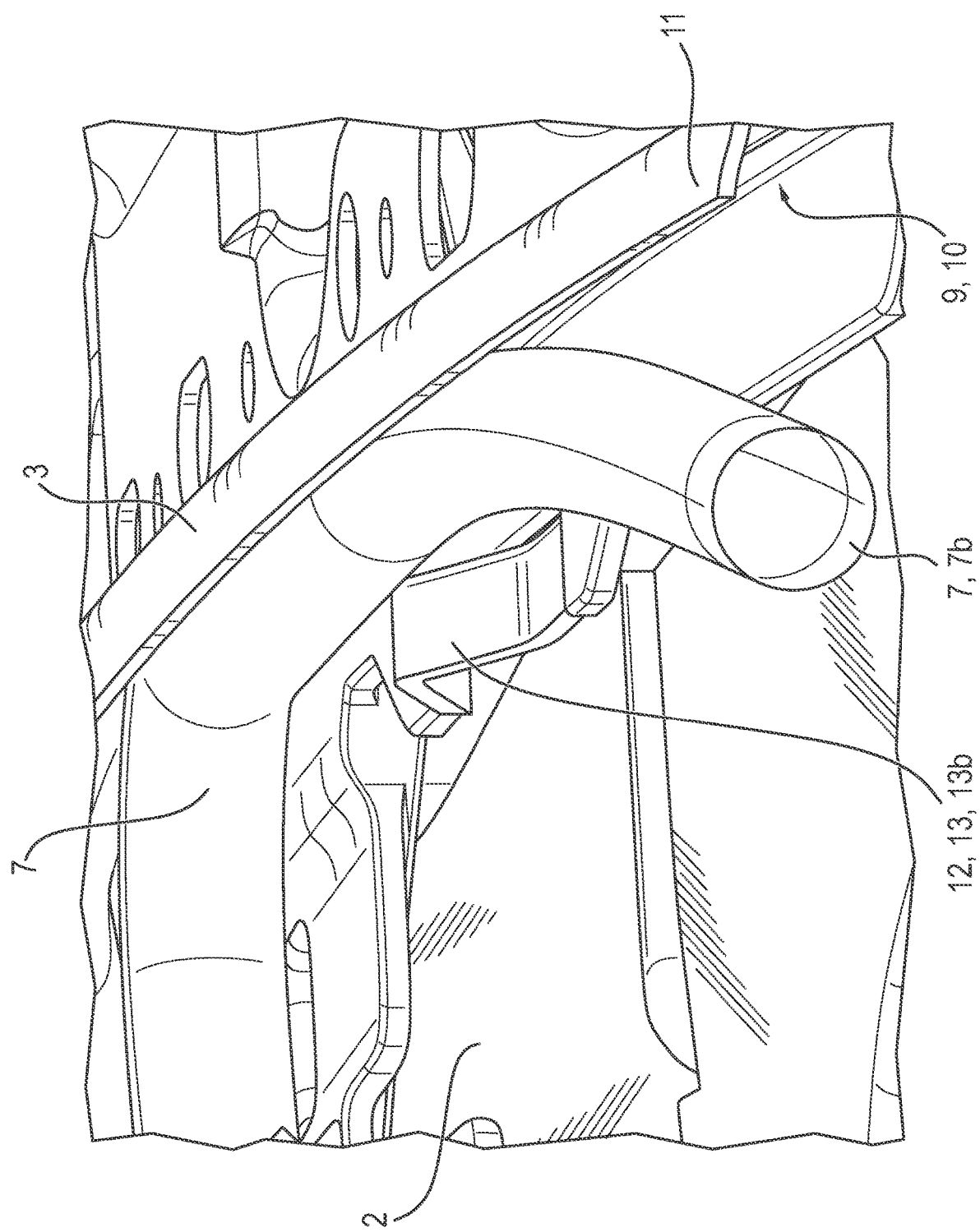

As can be seen relatively clearly from FIGS. 3 to 5, a resiliently or flexurally elastic securing element 12 for securing the guide tube 7 against escape from the guide region 9 is provided at a securing position P along the guide rail 3 and adjacent to the guide region 9. The securing element 12 is situated in front of the guide rail 3 in the X direction by a spacing which is preferably at least slightly less than the tube diameter of the guide tube 7.

As can be seen relatively clearly in FIG. 5, the spacing or the clear width between the securing element 12 and the rail edge, facing the latter, of the guide rail 3 is less than or equal to half the diameter of the guide tube 7. The securing position P of the securing element 12 is, in the longitudinal direction L of the guide rail 3, spaced apart in the Z direction from the first carrier-side tube end 7a of the guide tube 7 and is arranged in a region close to the open position of the window pane, along the guide rail 3, as can be seen relatively clearly from FIG. 1.

As can be seen from FIG. 5, the securing element 12 has a resilient bent section 13 or the securing element 12 has such a bent section 13 which is preferably formed from the carrier plate 2, for example as a stamped and bent part. The securing element 12 is designed like a ridged roof preferably in the manner of a ramp with a sliding ramp 13a or 13b which ascends and descends in the longitudinal direction of the rail L. One of the sliding ramps, in this case the sliding ramp 13b, is here formed on the end of the carrier plate 2.

The securing element 12 is designed and arranged in such a way that, when the carriage 4 is adjusted in the longitudinal direction of the rail L, it deforms the securing element 12 or its resilient bent section 13 at the securing position P so that it can spring back. The securing element 12 projecting or protruding from the XY plane of the carrier plate 2 thus retreats to the XY plate plane of the carrier plate 2 when the carriage 4 travels over it in the course of the adjustment movement of said carriage. The springing-back bent section 13 or its sliding ramps 13a, 13b is thus stretched, i.e., the angle between the sliding ramps 13a and 13b is enlarged and the bent section 13 is flattened. In this way, it is reliably prevented that the guide tube 7 or a tube section thereof can escape from the guide region 9.

In summary, the invention relates to an assembly 1 of an adjustment device of a motor vehicle, having a carrier plate as a carrier 2 on which at least one guide rail 3 is arranged, a carriage, guided displaceably thereon, as an adjustment part 4, in particular for a functionalized window pane F, and a flexible guide tube 7 for guiding a cable, in particular for supplying current to and/or controlling the functionalized window pane F, wherein the guide tube 7 is guided in a guide region 9, running in the longitudinal direction of the rail L, between the guide rail 3 and the carrier plate as a carrier 2, and wherein a resiliently or flexurally elastic securing element 12 for securing the guide tube 7 against escape from the guide region 9 is provided at a securing position P along the guide rail 3 and adjacent to the guide region 9.

It will be understood that the claimed invention is not limited to the above-described exemplary embodiment. Instead, other variants of the invention can also be derived by those of skill in the pertinent art within the scope of the disclosed claims without departing from the subject-matter of the claimed invention. In particular, moreover, all the individual features described in connection with the different exemplary embodiments can also be combined in a different way within the scope of the disclosed claims without departing from the subject-matter of the claimed invention.

In addition, the described solution can be used not only in the specifically illustrated application but also in a similar form in other motor vehicle applications such as, for example, in the case of an adjustable sunroof in the vehicle, in the case of door and tailgate systems, in the case of vehicle locks, in the case of adjustable seat and interior systems, and in the case of electric drives, control units, sensors and their application in the vehicle.

The following is a summary list of reference numerals and the corresponding structure used in the above description of the invention:
- 1 assembly
- 2 carrier/carrier plate
- 3 guide rail
- 4 adjustment part/carriage
- 4a (pane) adapter
- 5 retaining contour/structure
- 5a, 5b, 5c tube grippers/gripper element
- 6 cable drive/drive
- 7 guide tube
- 7a first tube end
- 7b second tube end
- 8a first/upper tube section
- 8b turning section
- 8c second/lower tube section
- 9 guide region
- 10 longitudinal slot/groove
- 11 raised lip
- 12 securing element
- 13 bent section
- 13a, 13b sliding ramp
- F (functionalized) window pane
- L longitudinal direction of the rail
- P securing position

The invention claimed is:

1. An assembly of an adjustment device of a motor vehicle, the assembly comprising:
    a carrier and at least one guide rail disposed on said carrier;
    an adjustment part displaceably guided on said guide rail; and
    a flexible guide tube for guiding an electric cable connected to, or connectible to, said adjustment part, said guide tube having a first tube end attached to said carrier and a second tube end attached to said adjustment part;
    wherein, during a displacement of said adjustment part along said guide rail, said second tube end is moved together with said adjustment part and, as said first and second tube ends approach one another, said guide tube is forcibly deflected in a curve; and
    wherein said guide tube is guided between said guide rail and said carrier in a guide region extending in a longitudinal direction; and
    a resiliently or flexurally elastic securing element disposed at a securing position along said guide rail, said securing element secures said guide tube against escape from said guide region.

2. The assembly according to claim 1, wherein, when said adjustment part is adjusted in the longitudinal direction along said guide rail, a tube section adjoining said second tube end of said guide tube passes a tube section adjoining said first tube end of said guide tube with a spacing oriented transversely to the longitudinal direction.

3. The assembly according to claim 1, wherein said guide region includes a longitudinal slot or groove in which said guide tube lies over a part of a peripheral or outer surface thereof.

4. The assembly according to claim 1, wherein said guide region is formed by a longitudinal slot or groove in which said guide tube lies over a part of a peripheral or outer surface thereof.

5. The assembly according to claim 1, which comprises a retaining contour disposed on said carrier spaced apart from said guide rail, wherein a tube section adjoining said first tube end of said guide tube is guided in said retaining contour.

6. The assembly according to claim 5, wherein at least one of the following is true:
    said retaining contour is formed of a plurality of tube grippers fastened to said carrier or formed therefrom; or
    said retaining contour is arranged along said guide rail in a region close to a first terminal position of said adjustment part.

7. The assembly according to claim 5, wherein at least one of the following is true:
    during a displacement of said adjustment part along said guide rail into a second terminal position of said adjustment part, said guide tube escapes from said retaining contour; or
    during a displacement of said adjustment part along said guide rail into the first terminal position, said guide tube enters said retaining contour.

8. The assembly according to claim 1, wherein at least one of the following is true:
    the securing position of said securing element is spaced apart, in the longitudinal direction, from said first tube end of said guide tube; or
    the securing position of said securing element is arranged along said guide rail in a region, close to a second terminal position of said adjustment part.

9. The assembly according to claim 1, wherein said securing element has at least one of a resilient bent section or an ascending and a descending sliding ramp.

10. The assembly according to claim 1, wherein said securing element is configured and/or positioned in such a way that, when said adjustment part is adjusted in the longitudinal direction, said adjustment part resiliently deforms said securing element at the securing position.

11. A window lifter of a motor vehicle, comprising the assembly according to claim 1.

12. An assembly of an adjustment device of a motor vehicle, the assembly comprising:
    a carrier plate and at least one guide rail arranged on said carrier plate;
    a carriage for a functionalized window pane displaceably guided on said guide rail; and
    a flexible guide tube for guiding a cable connected to, or connectible to, the functionalized window pane, the cable being configured for supplying current and/or for controlling the functionalized window pane;

said guide tube having a first tube end attached to said carrier plate and a second tube end arranged in a region of said carriage;

wherein, during a displacement of said carriage along said guide rail, said second tube end is moved with said carriage and, as said first and second tube ends approach one another, said guide tube is forcibly deflected in a curve; and wherein the guide tube is guided between said guide rail and said carrier plate in a guide region extending in a longitudinal direction of said rail; and a resiliently or flexurally elastic securing element disposed at a securing position along said guide rail, said securing element secures said guide tube against escaping from the guide region.

13. The assembly according to claim 12, wherein the functionalized window pane is an electrically switchable or controllable window pane.

14. The assembly according to claim 12, wherein said second tube end of said guide tube is attached to said carriage or to the window pane or to an adapter between the window pane and said carriage.

15. A window lifter of a motor vehicle, comprising the assembly according to claim 12.

* * * * *